UNITED STATES PATENT OFFICE.

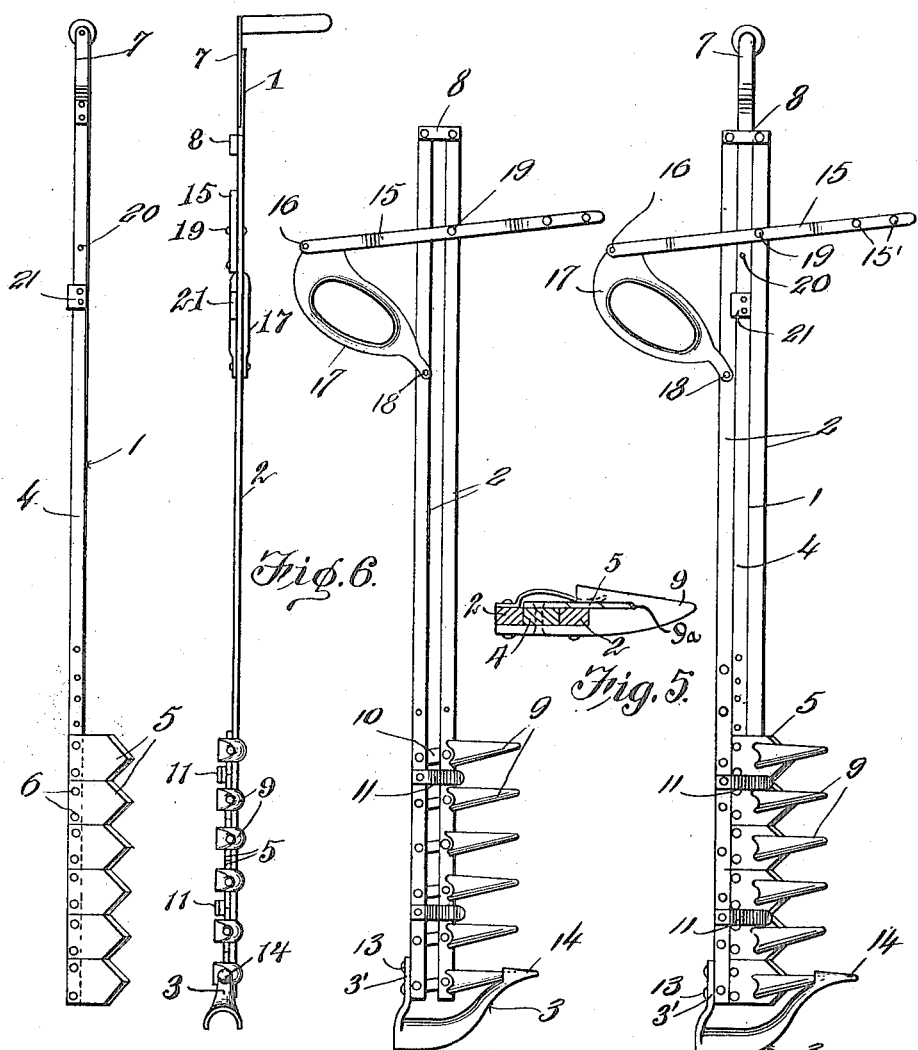

JAMES MORISON, OF WATSON, OREGON.

HAND-MOWER.

1,208,352.

Specification of Letters Patent.

Patented Dec. 12, 1916.

Application filed May 17, 1915. Serial No. 28,714.

*To all whom it may concern:*

Be it known that I, JAMES MORISON, citizen of the United States, residing at Watson, in the county of Malheur and State of Oregon, have invented certain new and useful Improvements in Hand-Mowers, of which the following is a specification.

My invention relates to improvements in cutting implements of the hand mower type and is designed primarily for use in cutting grass, alfalfa, willow sprouts, wild rose bushes and virtually all growth that tends to infest the banks of irrigating ditches, and especially the channels extending laterally from the ditches.

A further object of the invention is to provide an improved implement which will satisfactorily replace the now almost universally used scythe, the former or improved device being of a novel construction whereby growth may be cut in proximity to head gates, dams and like structures heretofore inaccessible to the scythe by reason of the limited operating space afforded.

As a still further object of the invention I contemplate a means whereby an increased leverage may be obtained should the mower be used for cutting growth of a stubborn nature.

I still further aim to generally improve the construction and to increase the operating efficiency of mowers and particularly mowers of the hand operated type.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 1 is a side elevation of the movable or reciprocable cutter bar; Fig. 2 is a side elevation of the stationary finger bar and its equipment; Fig. 3 is an elevation of the mower, the parts involved being shown operatively related; and Fig. 4 is a detail perspective view of the shoe or runner; Fig. 5, is a detail longitudinal sectional view taken through one of the guard fingers and associated parts, and Fig. 6, is a view in edge elevation of the complete mower.

Referring now to the drawings by numerals, 1 designates as an entirety the reciprocable finger bar, 2—2 the connected stationary bar sections, and 3 as an entirety the shoe or runner, which is provided at its rear end with a lateral extension 3′ for connection to one end of one of the bars 2. The reciprocable cutter bar structure 1 includes in addition to the bar proper 4, a plurality of knives or cutting blades 5, the several blades being arranged edge to edge and in superposed relation. Any means such as indicated at 6 may be used to fasten the blades to the bar. At the opposite end of the bar 4 from that equipped with the blades 5, I provide a handle structure 7, the latter, as will hereinafter appear, being operable to reciprocate said bar in a cutting operation.

The stationary finger bar structure, as suggested, includes the two parallel spaced bars 2 joined or connected at one end as indicated at 8, the connecting means affording a guide for the reciprocable cutter bar 1, the latter, in actual practice, being arranged to operate or reciprocate relatively to the spaced bars 2 and in the operating space therebetween.

Fingers or guards 9 (one for each blade 5) are fastened in any suitable manner to the stationary finger bar structure at the opposite end thereof from that connected as at 8 aforesaid, the several fingers or guards being positioned at a slight angle to a plane at right angles to the length of the implement whereby to comb, during operation of the mower, the growth to be cut and in this manner direct the growth against the cutting edge of the knives or blades. During the reciprocation of the reciprocable cutter bar 4, the blades 5 secured thereto are adapted to be reciprocated within the guard fingers 9, and the grass to be cut disposed between the guard fingers 9 is thereby severed, through a shearing action between the coacting cutter plates and fingers. The guard fingers 9, it will be noted, are after the usual manner provided with horizontal slots 9ª in which the blades 5 are adapted to operate. It is to be understood of course that each guard or finger 9 is longitudinally divided or split throughout a portion of its length to afford a working space for the several blades 5, the latter, by reason of their cutting edge formation being located to effect a shearing cut through reciprocation of the reciprocable cutter bar 1.

To preclude casual displacement of the bar 4 at the opposite end from that engaged by the connection 8, I provide a plurality of connecting strips 10, one located in proximity to each finger 9, and a plurality of overlapping guide strips 11, the latter being fastened to the opposite face or side of the stationary finger bar structure from that carrying the strips 10 aforesaid. The strips 10 and the members 11 operate to prevent displacement of the bar 4 during its reciprocation.

The members 11 are resilient and serve to press the cutting plate 5 upon one of the bars 2, so as to retain the said bar and plate in proper relation during reciprocation of the cutter bar. To accomplish the removal of the bar 4, the abutment plate 21 is removed, and the bar 4 drawn toward the handle end of the device until the cutter plates 5 are all removed from the guard fingers 9, whereupon the bar is rotated or twisted, so that the plates can pass through the slots between the bars 2, and the parts are then in disassembled relation.

As a guide, and as a support for the coacting bar sections I provide a peculiar type of shoe or runner 3, the runner extending from the lower end of the bar to which it is affixed to a point 14 where it is longitudinally bored to receive the forward terminal of the lowermost guard or finger 9. The mentioned engagement between the said enlargement and the guard will not only brace the runner but also act as a means to brace and reinforce the connection at the lower end of the implement.

To increase the leverage exertable on the bar 4, I provide a bar 15, which is employed at times as a lever, the said lever having a pivotal connection as at 16 with a handle 17 pivoted to the stationary finger bar 2 as indicated at 18 in Figs. 2 and 3. The said bar 15 is normally inoperative and so held by a thumb screw 19 carried thereby and engaging with the finger bar 2. Normally the handle 17 is grasped to hold the mower, while handle 7 is operated or reciprocated to move the reciprocable cutter bar. The handle 17 may be adjusted in several positions relative to the stationary finger bars by disposing the set screw 19 in any one of a series of openings 15' provided in the bar 15, and securing said set screw in the location as illustrated in Fig. 3. Should stubborn growth be acted on, and should operation of handle 7 prove ineffectual, the thumb screw 19 may be removed from the bar 15 and the lever affixed at a point 20 to the reciprocable cutter bar 4, the said bar when thus positioned being manipulatable to reciprocate the said bar and thus act as a lever, it being understood of course that the shoe or runner 3 is in engagement with the bed of the ditch or stream. To guide the bar 4 during reciprocation, an abutment plate 21 is secured thereto and adapted to partly overlap one of the bars 2. It will thus be noted that through the provision of the plate 21 and the cross bar 8, displacement laterally of the bar 4 in either direction is precluded.

From the foregoing, taken in connection with the accompanying drawings it is apparent that the growth upon the banks of irrigating ditches may be cut and removed by operating the hand mower here shown; that a stooping posture is unnecessary in effecting a cut, the mower, by reason of its length being manipulatable from an erect or standing position; and that places heretofore inaccessible to the scythe may be traversed by the mower and in this manner add materially to the efficiency and usefulness of the cutting implement.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. In a hand mower adapted for operation in a vertical position, a stationary finger bar, a reciprocable cutter bar, fingers secured to the stationary finger bar for the purpose specified, a shoe mounted at the lower extremity of said stationary finger bar, for engagement with the lowermost finger, and a handle formed upon the reciprocable cutter bar in vertical alinement therewith.

2. In a hand mower adapted for operation in a vertical position, a relatively stationary finger bar structure comprising spaced bar sections, a means maintaining the bar sections in rigid relation, a reciprocable cutter bar adapted for operation in the space between the respective bar sections, and having a series of cutter plates, a means maintaining the reciprocable cutter bars against displacement, guard devices secured to one section of the stationary finger bar for coaction with the aforesaid cutter plate, a shoe mounted at the lower extremity of the stationary finger bar for engagement with the lowermost finger, a handle formed upon the reciprocable cutter bar in vertical alinement therewith, and a means connecting one of the finger bar sections and the cutter bar for obtaining leverage during operation.

3. In a hand mower adapted for operation in a vertical position, a finger bar structure comprising spaced bar sections, one of said sections carrying the finger guards, a reciprocable cutter bar operable between said bar sections, a handle for operating said cutter bar, a handle on one of said bar sections, and a lever connected to the last mentioned handle, and detachably connected to the other of the bar sections, permitting direct manipulation of the cutter bar by means of the first mentioned handle, said lever being connectible to the cutter bar for actuation thereof to obtain an increased leverage.

In testimony whereof I affix my signature in presence of two witnesses.

JAMES MORISON.

Witnesses:
F. R. MILLER,
HARRY LOONEY.

Copies of this patent may be obtained for five cents each, by addressing the "Commissioner of Patents, Washington, D. C."